United States Patent [19]

Wiedenbeck et al.

[11] 4,262,940
[45] Apr. 21, 1981

[54] INTERNALLY COMPENSATED SELF-ALIGNING ROTARY JOINT

[75] Inventors: Roger D. Wiedenbeck; Eldon D. Jackson, both of Three Rivers, Mich.

[73] Assignee: The Johnson Corporation, Three Rivers, Mich.

[21] Appl. No.: 969,945

[22] Filed: Dec. 15, 1978

[51] Int. Cl.³ .................. F16L 3/00; F16L 27/04; F16L 39/04
[52] U.S. Cl. .................... 285/61; 285/135; 285/269
[58] Field of Search ............. 285/134, DIG. 1, 269, 285/268, 267, 165, 279, 135, 61

[56] References Cited

U.S. PATENT DOCUMENTS

| | | | |
|---|---|---|---|
| 2,175,752 | 10/1939 | Gray | 285/269 X |
| 2,361,811 | 10/1944 | Badger | 285/268 X |
| 2,385,421 | 9/1945 | Monroe . | |
| 2,477,762 | 8/1949 | Monroe . | |
| 2,497,183 | 2/1950 | Monroe . | |
| 2,631,048 | 3/1953 | Palmer | 285/269 X |
| 2,700,558 | 1/1955 | Hieronymus . | |
| 2,705,650 | 4/1955 | Saum . | |
| 2,805,086 | 9/1957 | Shumaker | 285/134 |
| 2,845,283 | 7/1958 | Kuhn | 285/267 X |
| 3,034,224 | 5/1962 | Wood . | |
| 3,133,754 | 5/1964 | Peters | 285/165 |
| 3,265,411 | 8/1966 | Monroe et al. . | |
| 3,606,394 | 9/1971 | Maurer et al. | 285/134 |
| 3,874,707 | 4/1975 | Calkins . | |

*Primary Examiner*—Thomas F. Callaghan
*Attorney, Agent, or Firm*—Beaman & Beaman

[57] ABSTRACT

The invention pertains to a rotary joint wherein pressures imposed upon the joint by the pressurized medium therein are internally compensated. The joint is characterized by its ability to accommodate axial drum expansion, minimize rotative friction and the major joint components are self-aligning with respect to rotary motion. The basic components include a body member receiving an end of a nipple member, one of the members being fixed against axial displacement. A single annular nipple seal mounted upon the nipple member within the body member chamber engaging a seal ring constitutes the sole mechanical connection between the body and nipple members, and the fact that the nipple seal is axially displaceable upon the nipple member permits an internal compensation of axial forces produced within the joint, permits accommodation of axial thermal expansion of the joint components, and the spherical configuration of the nipple seal provides self alignment between the body and nipple members.

4 Claims, 8 Drawing Figures

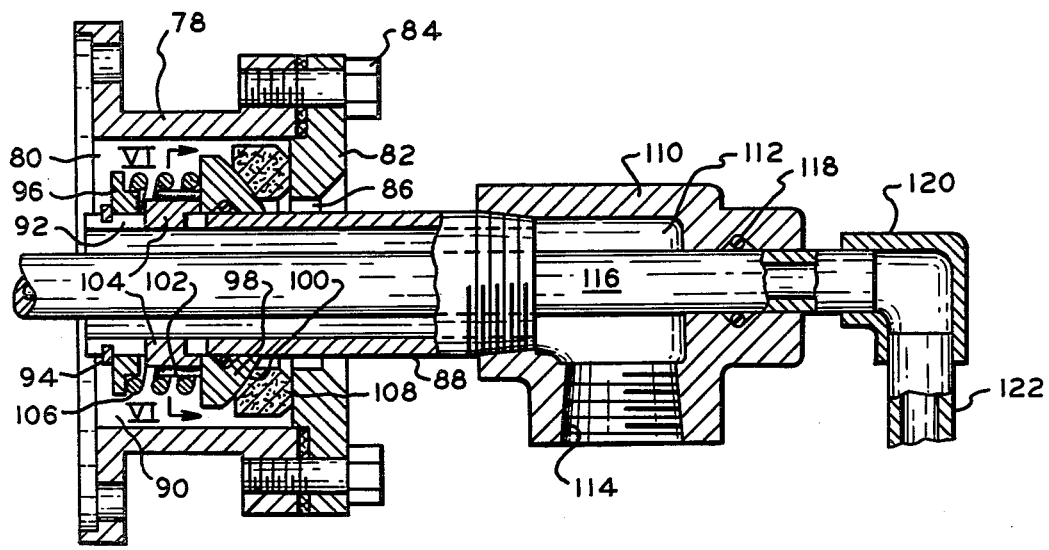
FIG_5_
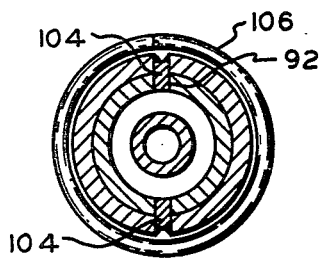
FIG_6_
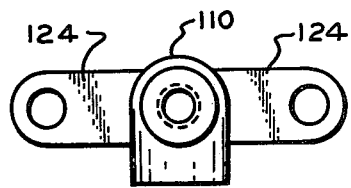
FIG_7_
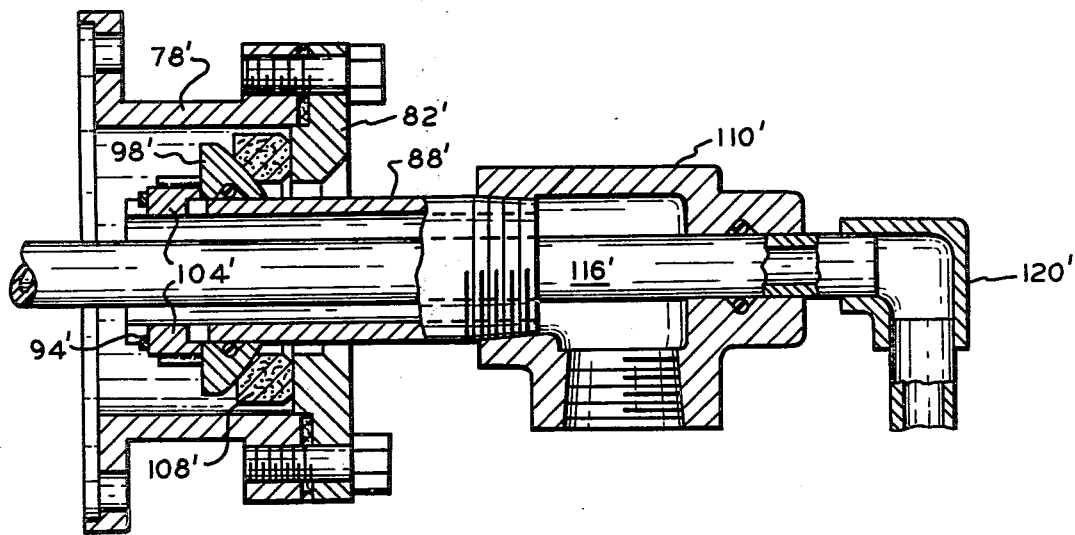
FIG_8_

INTERNALLY COMPENSATED SELF-ALIGNING ROTARY JOINT

SUMMARY OF THE INVENTION

The invention pertains to rotary joints for conducting pressurized fluids wherein the seal thereof is internally compensated against fluid pressures.

Rotary joints are employed to introduce or remove fluids, either in liquid or gaseous states, into rotating treatment drums. Such drums may be used for either heating or cooling purposes, and are widely utilized in the paper making, fabric and web processing arts. In paper making apparatus, for instance, many rotating dryer drums are employed in series to remove moisture from the product, and such heated drums usually employ steam as the heat transfer medium. Rotary joints are used to introduce the steam into the drum, and the syphon system for the condensate also includes rotary joint structure.

Rotary joints commonly available utilize a body member having a tubular nipple mounted at one end to the rotary drum and an outer end received within the body. Seal structure mounted on the nipple cooperates with seals defined within the body wherein relative rotative movement occurs between the body and nipple and a pressurized fluid may be transmitted through the body into the nipple and drum. Such conventional constructions utilize a "inner" nipple seal which is fixed upon the nipple and engages a wear seal within the joint body. Examples of this type of rotary joint are shown in the assignee's U.S. Pat. Nos. 2,385,421; 2,477,762; 2,497,183 and 3,265,411.

In the aforementioned type of rotary joints internal pressures existing within the body created by the pressurized medium tend to axially displace the body in a direction which increases the area surface pressure between the fixed nipple seal and the associated wear seal. This increase in seal pressures unduly wears the seals and produces higher frictional forces than necessary to achieve effective sealing and increasing the power consumption with respect to rotating the drying drums associated with the rotary joints.

The aforementioned seal pressure and friction have attempted to be minimized by employing compensating devices with rotary joints and such compensating devices are shown in the assignee's U.S. Pat. Nos. 2,700,558 and 3,874,707, and in U.S. Pat. No. 2,705,650. While such external compensating devices do reduce the seal wear rate and improve the friction characteristics, such compensators are expensive, undependable in operation, and require periodic maintenance and inspection.

It has been suggested that rotary joint constructions wherein the nipple seals are axially slidably mounted upon the associated nipple, rather than affixed thereto, would result in a joint having an internal pressure compensation and U.S. Pat. Nos. 2,631,048 and 3,034,224 show such constructions. The latter patent issued to Wood discloses in detail the problems present in available rotary joints and the objectives of improved joint constructions. However, these patents do not disclose structure which functions to completely overcome the deficiencies of the prior art, and the disclosed rotary joint apparatus of these patents does not permit joints to be located at the opposite ends of a common heated dryer drum due to difficulties arising from the expansion of the drum in the direction of the drum axis during heating.

It is an object of the invention to produce a rotary joint of economical construction capable of accommodating axial component expansion, minimizing rotative friction, having self-aligning characteristics, and internally compensating for axial thrust forces produced by the pressurized fluid therein.

A further object of the invention is to provide a rotary joint of dependable operation and simplified construction having improved seal ring wear characteristics, and wherein means are provided for preventing the joint body from being "blown" from the nipple.

An additional object of the invention is to provide a rotary joint utilizing spherical sealing surfaces at a single location wherein self-aligning of the nipple relative to the body occurs at all stages of seal wear.

Yet another object of the invention is to provide a rotary joint which is internally pressure compensated, self-aligning, and of a construction capable of accommodating axial thermal expansion wherein rotary joints in accord with the invention may be mounted at each end of a heated dryer drum and the joints will efficiently function at all drum temperatures.

In the practice of the invention a hollow body member receives the end of a tubular nipple. In the usual installation the exterior end of the nipple communicates with the drum to be heated, and steam supply and condensate conduits are connected to the body. However, a reverse installation is possible wherein the body is attached to the rotary drum and the supply and/or syphon conduits are associated with the nipple.

The nipple extends through a central opening defined in a wear plate attached to the body and an annular graphite wear seal sealingly engaging the wear plate is engaged upon the opposite side by a nipple seal mounted upon the nipple. The nipple seal surface engaging the wear seal is of a spherical configuration, and the nipple seal is mounted upon the nipple for axial displacement thereon, but is keyed to the nipple to prevent relative rotation thereto.

The body, or in the reverse installation, the nipple, is fixed against movement in the axial direction of the joint and drum by support rods mounted upon the drum supporting structure. Thus, this fixed portion of the rotary joint will not rotate and remain stationary in an axial direction. However, thermal expansion of the dryer drum will axially displace the rotative component of the joint, and the fact that the nipple seal is axially displaceable upon the nipple permits the nipple seal to locate itself upon the nipple in the pre-determined manner.

The area of the nipple seal exposed to the internal pressure within the body is designed in accord with the seal area not exposed to the internal pressures such that the resulting differential pressure will maintain the nipple seal in an effective fluid tight relation with the graphite wear seal, but the sealing pressures will be only great enough to provide effective sealing without producing excessive rotational friction. Such sealing pressures may be produced solely by the internal body pressure, but a compression spring may be used to bias the nipple seal toward the wear seal, the spring primarily functioning to maintain the nipple assembly tight within the body during handling and low pressure start up conditions.

As the only direct engagement between the body and the nipple is through the spherical nipple seal surface and the wear ring, the body and nipple are self-aligning during relative rotation regardless of the extent of wear occurring at the wear seal. Thus, slight misalignments occurring during mounting of the rotary joint will not impose stresses on the wear seal which will shorten the seal life.

Key means are interposed between the nipple seal and nipple to prevent relative rotative displacement, and this key means is of such construction to prevent the nipple seal from being removed from the associated nipple end. Such a relationship prevents the body from being "blown" from the nipple and is an important safety feature.

BRIEF DESCRIPTION OF THE DRAWINGS

The aforementioned advantages and objects of the invention will be appreciated from the following description and accompanying drawings wherein:

FIG. 5 is an elevational, diametrical, sectional view of another embodiment of rotary joint in accord with the invention illustrating a drum mounted body, FIG. 6 is an elevational sectional view as taken along Section VI—VI of FIG. 5, FIG. 7 is an end elevational view of the nipple adapter as taken from the right of FIG. 5, the elbow not being shown, and FIG. 8 is a diametrical, elevational, sectional view of another embodiment of a rotary joint in accord with the invention utilizing a drum mounted body.

DESCRIPTION OF THE PREFERRED EMBODIMENT

Figure 1:
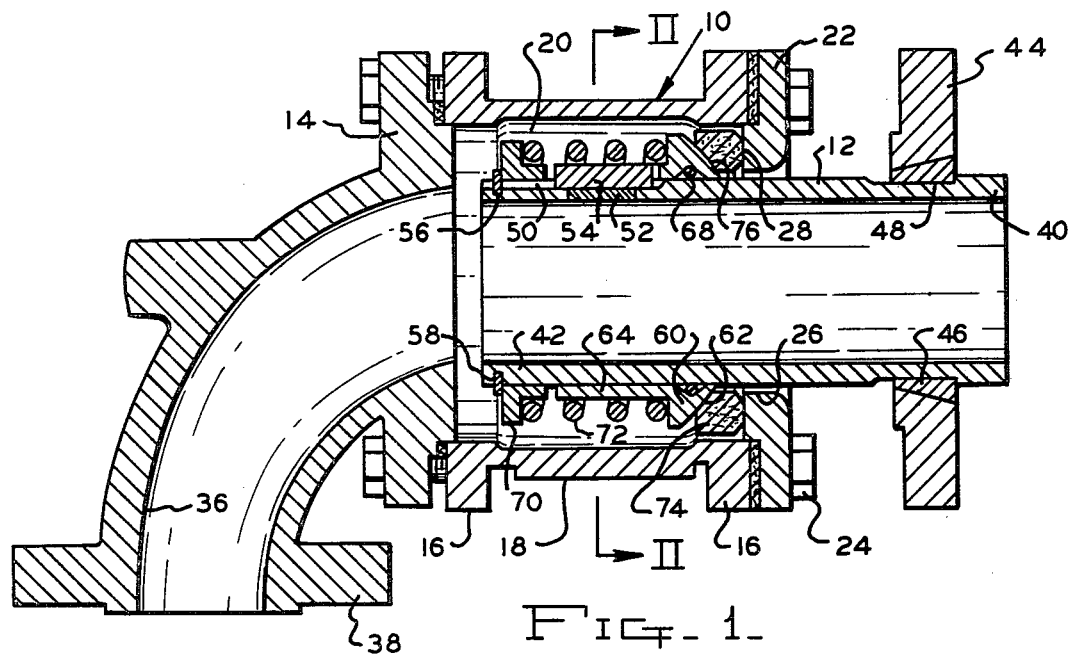
FIG. 1 is an elevational, diametrical, sectional view of a rotary joint constructed in accord with the invention illustrating an elbow head mounted upon the body.

With reference to FIG. 1, a rotary joint utilizing the concepts of the invention includes a body member or casing 10 mounted on a rotating tubular nipple 12, and conduit means communicate with the interior of the body, such conduit taking the form of a pipe plug or head 14 bolted to one end of the body.

The body 10 is of a generally cylindrical hollow configuration having enlarged flange ends 16 in which axial threaded holes are defined for attachment of the wear plate and end head. A portion of the body, such as at 18, may be of a greater radial thickness in order to permit a threaded opening to be defined therein for receiving a conduit communicating with the body chamber 20. The inner end of the body is enclosed by an annular wear plate 22 attached to the body by bolts 24 threaded into holes defined in the adjacent flange 16, and the wear plate includes a central cylindrical opening 26 and an inner flat seal surface 28.

Figure 3:
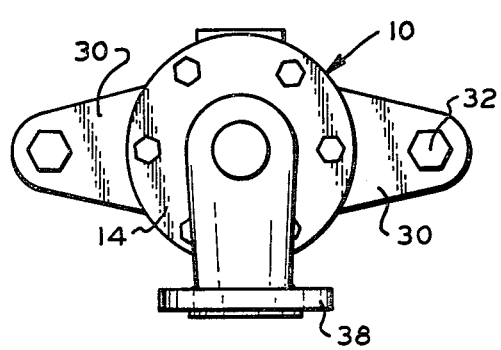
FIG. 3 is an end elevational view of FIG. 1 as taken from the left.
Figure 4:
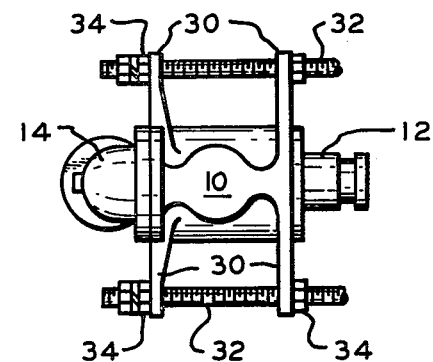
FIG. 4 is a top plan view of the rotary joint of FIG. 1.
Figure 2:
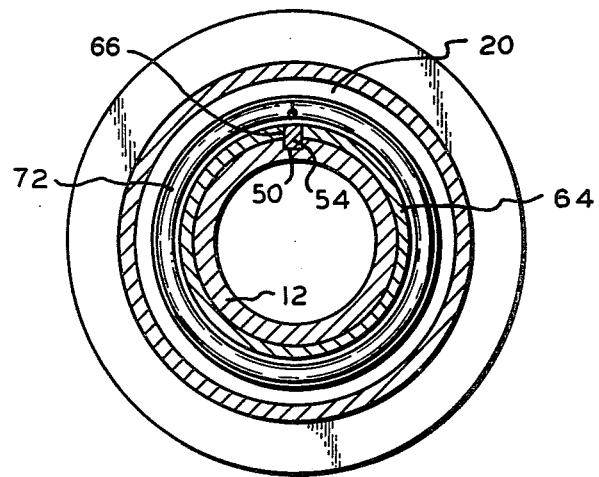
FIG. 2 is an elevational sectional view taken through Section II—II of FIG. 1.

Projections or lugs 30 are defined upon the body 10 radially extending therefrom on opposite horizontal sides, FIGS. 3 and 4, and these lugs are provided with aligned holes whereby a pair of support rods 32 may extend therethrough, a rod being on each side of the body, and nuts 34 fix the body to the support rods. The support rods 32 are attached to fixed structure, not shown, usually a bearing support for the rotary joint is associated. The rods 32 prevent the body 10 from being displaced in an axial direction, or rotating.

The illustrated rotary joint is of the "flow through" type wherein the passage 36 defined in the pipe plug 14 aligns with the body axis and the passage of the nipple 12. The lower end of the pipe plug is provided with the flange 38 whereby a flexible pipe or the like may be attached thereto for either supplying steam or hot water to the joint, or if the nipple 12 is attached to a drum syphon, a drum syphon system conduit will be attached to the flange 38. It is also contemplated that the head 14 may be of such configuration as to accommodate an internal syphon pipe and in such instance wherein a single rotary joint is used to introduce steam into the drum, the syphon pipe is sealed to the head 14. Such dual purpose of a rotary joint is common in the art as illustrated in the aforementioned patents.

The nipple 12 includes an outer end 40 and an inner end 42, the latter being located within the body chamber 20. The outer end 40 is attached to the associated drum, not shown, in a manner coaxial with the axis of drum rotation, and in the illustrated embodiment the means for connecting the nipple to the drum includes the mounting flange 44 and tapered split bushing 46 associating with nipple annular groove 48. The nipple outer end can also be threaded, or flanged, for establishing a fluid tight connection with the drum interior.

The inner end 42 of the nipple is provided with an axially extending key slot 50, and the nipple is drilled at 52 whereby a key 54 may be welded into the key slot through the drilled opening as apparent in FIGS. 1 and 4. Also, the nipple inner end is provided with an annular groove 56 for receiving the snap ring 58.

A nipple seal 60 is mounted upon the inner end 42 within body chamber, and the nipple seal is of an annular configuration including an enlarged diameter head having a spherical sealing surface 62 defined thereon. The center of surface 62 lies on the axis of nipple 12. The nipple seal also includes an axially extending cylindrical stem 64 having an axial slot 66 defined therein for receiving the key 54. The nipple seal is sealed to the nipple 12 by O-ring 68 received within a recess, and it will be appreciated that the nipple seal is free to axially slide on the nipple 12, while the key 54 will prevent relative rotation between the nipple and nipple seal.

An annular spring shoulder ring 70 is located adjacent the stop ring 58 and compression spring 72 is interposed between shoulder 70 and the nipple seal head biasing the nipple seal 60 toward the right, FIG. 1.

An annular seal ring 74 formed of a graphite material is located between the nipple seal 60 and the wear plate surface 28. Seal ring 74 includes a spherical seal surface 76 complimentary to the spherical configuration of the nipple seal surface 62 and a flat radial seal ring surface sealingly engages the flat surface 28 of wear plate 22.

In installation, the nipple 12 is coaxially mounted upon the drum by the mounting flange 44, the support rods 32 are attached to fixed supporting structure, and a conduit, not shown, is attached to the head flange 38. In a single fluid flow through type rotary bearing as shown in FIG. 1, an identical rotary bearing may be attached to the other end of the associated rotating drum, one of the rotary joints being used to convey steam to the drum, while the other joint is connected to the condensate removal system for the drum.

When steam is introduced into the drum a superatmospheric pressure will exist, and the presence of this superatmospheric pressure within the body chamber 20 produces a piston like effect on the body 10 endeavoring to axially displace the body away from the nipple 12. If the nuts 34 on the support rods 32 are properly positioned such axial force can be largely counteracted by the support rods. In the instant invention, excessive sealing forces at seal surfaces 62 and 76, and 28 are prevented due to the fact that the nipple seal 60 is axially displaceable upon the nipple 12. Thus, while the internal pressure within chamber 20 tends to bias the body 10 toward the left, FIG. 1, the fact that the nipple seal 60 is capable of being displaced to the left on the nipple assures that only a predetermined axial force will exist at the sealing surfaces. This predetermined axial force is determined by the "piston" effect on the nipple seal 60 endeavoring to force the nipple seal toward the right under the influence of the fluid pressure within chamber 20, and additionally, the biasing force produced by the spring 72 will be added to this fluid produced force. As the pressure within chamber 20 is known, as is the biasing force of spring 72, the nipple seal head and surface 62 is so dimensioned as to produce the desired seal engaging pressures for a given installation whereby effective minimum sealing pressures can be maintained throughout the operation of the rotary joint resulting in maximum life from seal ring 74 and resulting in minimal frictional rotative forces existing between the body 10 and nipple 12.

Additionally, an important aspect of the disclosed construction lies in the ability of the rotary joint to accommodate longitudinal expansion of the nipple relative to the body. As the drum to which the nipple is affixed is heated its axial length will increase, and thereby "push" the nipple 12 further into the chamber 20 endeavoring to separate the seal surfaces 62 and 76 and at 28. However, with the invention the axial movement of the nipple seal on the nipple permits the nipple tube to move to the left FIG. 1, as such nipple longitudinal displacement takes place thereby maintaining the desired seal pressures regardless of the extent of drum expansion and nipple displacement.

Another significant advantage derived from the described construction results from the fact that the only direct mechanical interconnection between the nipple 12 and the body 10 is through the spherical seal surfaces 62 and 76. The spherical configuration of these surfaces assures a full area effective seal regardless of the fact that slight eccentricities may exist between the axis of rotation of the nipple 12 and the axis of the body 10. Thus, it is possible that as the drum rotates either the body or nipple may nutate slightly relative to the other without adversely affecting the seal sealing efficiency or frictional characteristics. Such a self-aligning action is not possible with rotary joints utilizing nipple seals, or the equivalent, which engage body structure at spaced axial locations along the nipple.

The presence of the snap ring 58 on the nipple inner end assures that the nipple seal 60 cannot be removed from the nipple, and the snap ring produces an important safety feature as compared with many rotary joint constructions which may permit the body to be blown from the nipple.

Accordingly, it will be appreciated that the aforedescribed rotary joint construction provides numerous desirable attributes in a rotary joint, and the relatively simple and economical construction permits such joints to be manufactured and sold at reasonable cost.

A variation in construction and association of components is shown in the embodiments of FIGS. 5-8 wherein the concepts of the invention are achieved in a rotary joint wherein the body is directly mounted upon the associated drum, while the nipple structure is directly associated with the exterior supply and syphon plumbing system. In the embodiment of FIG. 5, the rotary joint body 78 is bolted to the end of a rotating drum, not shown, or the rotating drum adapter, in such a manner that the axis of the body will coincide with the drum axis. The end of the body disposed toward the drum is open as at 80 as to be in direct communication with the drum interior, and a wear plate 82 is bolted to the body outer end by threaded bolts 84. The wear plate includes a central opening 86 of greater diameter than the diameter of the nipple 88, and the nipple includes an inner end located within the body chamber 90.

The nipple inner end is diametrically slotted at 92, and is grooved to receive a snap ring 94 against which the annular spring shoulder 96 bears. A nipple seal 98 having a spherical surface 100 includes the axially extending stem 102 which is diametrically slotted and receives keys 104 which are welded within the stem slots and extend into the nipple slots 92. A compression spring 106 interposed between the nipple seal 98 and the spring shoulder 96 biases the nipple seal toward the right, FIG. 5, and the graphite seal ring 108 interposed between the nipple seal and wear plate 82 includes complimentary sealing surfaces to seal the joint in the manner described above. The nipple seal 98 is axially slidably mounted upon the cylindrical nipple 88 and is sealed thereto by an O-ring, and while the keys 104 permits such relative axial displacement, the keys do prevent relative rotation between the nipple seal and nipple.

The nipple outer end is provided with an adapter 110 threaded thereon, and this adapter includes a chamber 112 communicating with the interior of the nipple which includes a threaded steam inlet port 114 to which the steam supply conduit, not shown, is affixed. A syphon pipe 116 extends through the nipple for attachment to the drum syphon system, not shown, and the syphon pipe extends through the adapter and is sealed thereto by O-ring 118, while elbow 120 and conduit 122 constitute a portion of the condensate removal plumbing. In the disclosed embodiment the syphon pipe 116 is not intended to rotate relative to the nipple 88 as a stationary drum syphon is being used, but it is within the perview of the invention to utilize a seal between the syphon pipe and adapter 110 which permits a rotating syphon structure to be accommodated in the disclosed embodiment.

A pair of ears 124, FIG. 7, extend from opposite sides of the adapter 110 whereby support rods, not shown, may be used to fix the adapter, and nipple, with respect to stationary structure, the support rods being identical to those shown in FIG. 4 at 32. In this manner the adapter and nipple are restrained against axial displacement and rotation.

The operation and advantages of the embodiment of FIG. 5 are substantially similar to those of the embodiment of FIGS. 1-4. Steam is introduced into the drum through chamber 112 and nipple 88, and the drum condensate is removed through conduits 116 and 112. The drum pressure will be imposed within body chamber 90 biasing the nipple seal 98 toward the right into engagement with seal ring 108 and the minimum predetermined sealing forces between the nipple seal, seal ring and wear plate 82 will be maintained during all axial positions of the drum even though such axial position changes due to drum longitudinal expansion. The axial displacement of the nipple seal on the nipple provides the desired internal compensation as well as maintaining minimum seal friction and self alignment between the body and nipple, and the presence of the snap ring 94 prevents the nipple from being blown from the rotary joint.

The embodiment of FIG. 8 is identical to that of FIG. 7 and like primed reference numerals are used for identical components. The only difference between the embodiments of FIGS. 5 and 8 being that the spring shoulder 96 and the compression spring 106 are omitted. The omission of the spring 106 does not adversely affect the operation and advantages of the invention, and it is possible to omit the spring 72 from the embodiment of FIG. 1 in a like manner. The purpose of the spring is to aid in assembly of the components and joint, and prevent excessive axial movement between the body and nipple prior to the interior of the joint being subjected to fluid pressure. Once the body chamber is pressurized such pressure constitutes the primary force for maintaining engagement of the nipple seal and seal ring. It is to be understood that the presence of the spring is not critical to the advantages derived by the disclosed embodiments.

It will be appreciated that the described embodiments disclosed structure for achieving the desired attributes in a rotary joint, and it is appreciated that various modifications to the disclosed embodiments may be apparent to those skilled in the art without departing from the spirit and scope of the invention.

I claim:

1. An internally compensated rotary joint characterized by its ability to accomodate axial expansion, minimize rotative friction and be self-aligning comprising, in combination, a hollow body member having an axis, ends and defining a chamber, an annular wear plate mounted upon one of said body member ends and having a central opening defined therein, a tubular nipple member having first and second ends, said nipple member extending through said wear plate opening wherein said first end is located within said body member chamber, said wear plate opening being of greater diameter than that of said nipple member whereby a significant radial clearance exists between said opening and nipple member, mounting means defined on one of said members for fixing said member against axial and rotative movement, a single annular nipple seal axially slidably mounted on said nipple member first end within said chamber having an annular sealing surface facing said wear plate and a pressure surface transverse to said body member axis exposed to said chamber, abutment means defined on said nipple member first end limiting axial movement of said nipple seal toward said first end, key means keying said nipple seal to said nipple member to prevent relative rotational movement thereto, an annular seal ring interposed between said sealing surface and wear plate and sealingly engaged thereby, said nipple seal sealing surface comprising a spherical segment engaging a complementary spherical surface defined on said seal ring defining a sealing area, said spherical surfaces having a center lying on the axis of said nipple member, the area of said nipple seal pressure surface being sufficiently larger than that of said sealing area whereby the pressure within said chamber produces an axial differential pressure on said nipple seal toward said seal ring to produce a predetermined sealing pressure at said sealing area, and an opening defined in said body member for establishing fluid medium communication between said chamber and the fluid medium to be conveyed through the rotary joint, said nipple member first end and abutment means being unsupported and freely radially and axially movable, the sole mechanical interconnection between said body member and said nipple member being through said seal ring at said spherical surfaces, said body member being self-aligning with respect to said nipple member due to said spherical surfaces and said clearance between said wear plate opening and said nipple member.

2. In an internally compensated rotary joint as in claim 1 wherein said mounting means comprises bolt receiving holes defined in said body member having an axis substantially parallel to said body member axis, said body end opposed to said wear plate being open defining said body member opening for establishing fluid medium communication with said chamber whereby said body member may be directly mounted upon the rotary member with which the rotary joint is associated.

3. In an internally compensated rotary joint as in claim 1, an annular groove defined in said nipple member circumscribing said first end, said abutment means comprising an abutment ring received within said groove, said ring retaining said nipple seal upon said nipple member.

4. In an internally compensated rotary joint as in claim 3, an annular spring shoulder ring mounted on said nipple member first end engaging said abutment ring and a compression spring circumscribing said first end interposed between said shoulder ring and said nipple seal biasing said nipple seal toward said seal ring.

* * * * *